Figure 1:
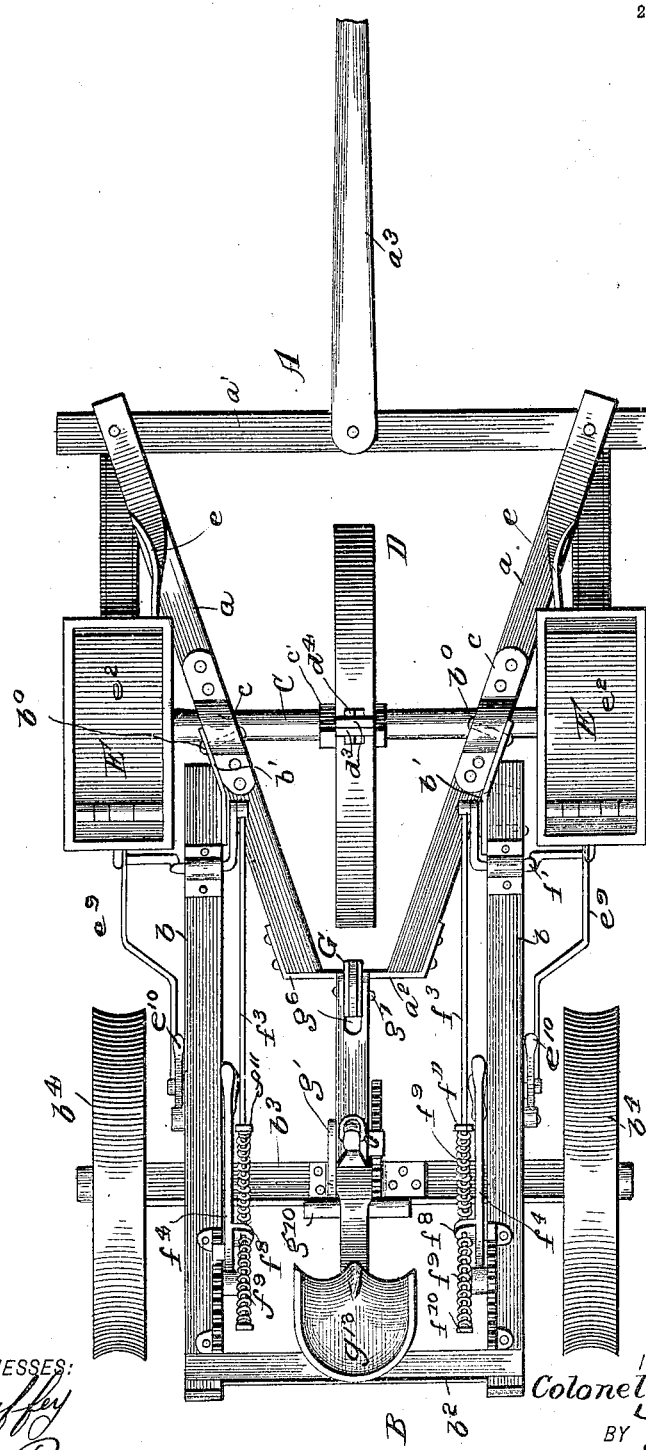

No. 812,755. PATENTED FEB. 13, 1906.
C. W. LANHAM.
CORN PLANTER.
APPLICATION FILED SEPT. 30, 1905.

2 SHEETS—SHEET 1.

WITNESSES:
C. C. Duffey
Jos. A. Ryan

INVENTOR
Colonel W. Lanham
BY Munn & Co.
ATTORNEYS

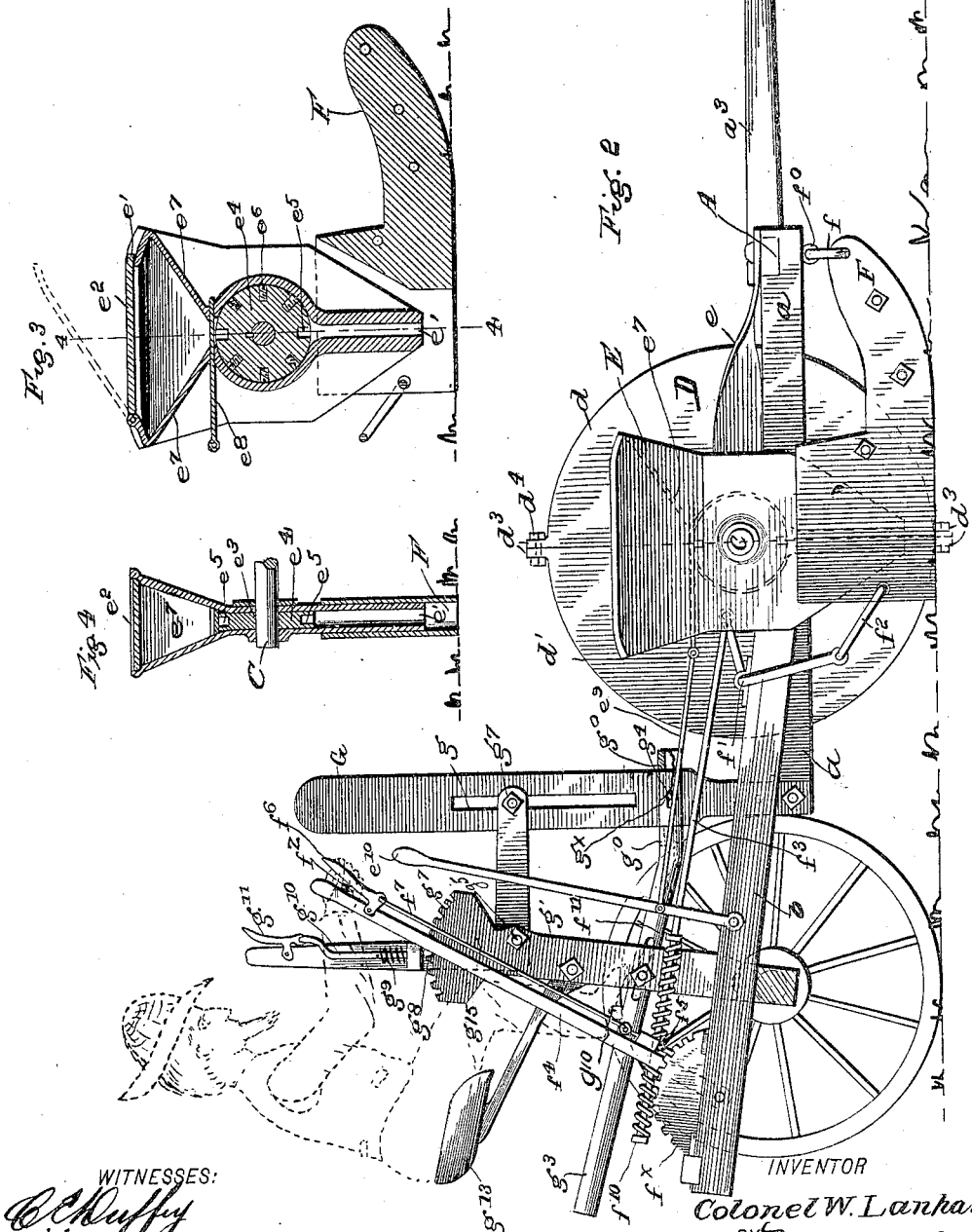

UNITED STATES PATENT OFFICE.

COLONEL WOLFORD LANHAM, OF STANFORD, KENTUCKY.

CORN-PLANTER.

No. 812,755.　　　　Specification of Letters Patent.　　　　Patented Feb. 13, 1906.

Application filed September 30, 1905. Serial No. 280,823.

*To all whom it may concern:*

Be it known that I, COLONEL WOLFORD LANHAM, a citizen of the United States, and a resident of Stanford, in the county of Lincoln and State of Kentucky, have invented certain new and useful Improvements in Corn-Planters, of which the following is a specification.

My invention is an improvement in corn-planters; and it consists in certain novel constructions and combinations of parts hereinafter described and claimed.

In the drawings forming a part hereof, Figure 1 is a plan view of my improved corn-planter. Fig. 2 is a side elevation partly in section. Fig. 3 is a vertical longitudinal section through the hopper and shoe or furrow-opener, and Fig. 4 is a section on the line 4 4 of Fig. 3.

In the practical application of my invention I provide a frame comprising a plurality of sections—a substantially triangular front section A and a substantially rectangular rear section B. The front section A comprises the side bars $a$ and the cross-bar $a'$, the side bars being connected at the rear by a bracket $a^2$, a tongue $a^3$ being connected to the center of the cross-bar. The rear section B comprises the side bars $b$, connected at their rear end by the cross-bar $b^2$, an axle $b^3$ being arranged transversely of the side bars intermediate the ends thereof, upon which are journaled the wheels $b^4$ for supporting the frame. Brackets $b'$, arranged upon the front ends of the side bars $b$, are pivoted to the side bars $a$ by means of a pin $b^6$. A shaft C is journaled transversely of the triangular section of the frame A in bearings $c$ upon the side bars $a$, the said shaft projecting beyond the frame at either side and having at the center thereof a squared portion $c'$ for a purpose to be hereinafter described. A power-wheel D, comprising the semicircular segments $d$ $d'$, connected together by the bolts $d^4$, traversing openings in lugs $d^3$ upon the ends of the semicircular segments, is arranged upon the shaft C, the segments being provided with square recesses coacting when the segments are connected together to form a square opening for engaging the square portion of the shaft $c'$. The lugs $d^3$ form oppositely-arranged projections upon the wheel at a distance of one hundred and eighty degrees from each other, the lugs being of a sufficient size to form a dent in the ground when the planter is moved thereover.

Hoppers E are arranged upon either side of the frame, the hoppers being supported by brackets $e$, secured to the triangular portion and being provided with openings $e^3$ for the reception of the ends of the shaft C. The hoppers are open above and below, as at $e'$, and are provided with a lid $e^2$ for closing the upper opening. The lower portion of the hopper is rectangular in cross-section, and within this portion is arranged a dropping-wheel $e^4$, fixed to the end of the shaft C, the said wheel being provided with a plurality of screw-threaded openings $e^5$ of suitable size and spaced apart at regular intervals, the openings being adapted to be closed by screw-threaded plugs $e^6$. Suitable shields $e^7$ form front and rear sides of the hopper and prevent the passage of corn along the periphery thereof, and at the lower part of the flaring portion of the hopper immediately above the dropping-wheel is arranged a sliding plate or cut-off $e^8$, connected by a link $e^9$ with a lever $e^{10}$, pivoted upon the rectangular portion of the frame. By moving this lever backward and forward the plate may be moved into position to close the lower end of the flaring portion of the hopper or to open the same.

A shoe or furrow-opener F, having the general shape shown in Fig. 2, is arranged below the open end of the rectangular portion of the hopper E, the shoe being hinged to the front ends of the side bars by a link $f$, traversing an opening in the shoe and engaging an eyebolt $f^0$ on the said side bars. Rock-shafts $f'$ are journaled upon the side bars of the rectangular portion of the frame A, one of the arms of the shafts being connected by a link $f^2$ with the rear end of the shoe. The other arm of the rock-shaft is connected by a link $f^3$ with a lever $f^4$, pivoted upon the side bar of the rectangular portion of the frame and at the rear of the rock-shaft $f'$. The lever $f^4$ is provided with a tooth $f^5$ for engaging a toothed quadrant $f^x$, secured to the side bar, the said tooth being normally pressed into engagement with the quadrant by a spring $f^z$ and being actuated by a grip $f^6$, pivoted to the lever and connected to the tooth by a link $f^7$. The link $f^3$ passes through an eye $f^8$ upon the lever $f^4$, and springs $f^9$ are arranged upon either side of the eye between the nut $f^{10}$ on the end of the link and the collar $f^{11}$ between the lever and the rock-shaft. This arrangement allows of vertical motion of the shoe against the resistance of the springs to prevent strain upon the connections of the shoe from inequalities of the ground, such as stones, roots, &c.

An upright lever G, provided with a vertical slot $g$, is pivoted to the bracket $a^2$, connecting the adjacent ends of the side bars of the triangular section of the frame. Upwardly-projecting spaced brackets $g'$ are secured to the axle, and between the brackets is pivoted a foot-lever $g^3$. The inner end of the foot-lever $g^3$ is slotted horizontally to receive the lever G and is connected thereto by a pin-and-slot connection $g^4$. A rock-shaft $g^5$ is pivoted in the upper ends of the brackets $g'$, one of the arms being slotted, as at $g^6$, to receive the lever G, the arm and the lever being secured together by a pin $g^7$, traversing the slot $g$ of the lever G. A tooth $g^8$, slidably mounted upon the other arm of the rock-shaft $g^5$, is normally pressed into engagement with the quadrant $g^{15}$, secured to one of the brackets by a spring $g^9$, encircling the link $g^{10}$, connecting the tooth with the grip $g^{11}$, pivoted upon the upper end of the arm and rock-shaft.

The rock-shaft $g^5$ is for the purpose of varying the angle of the lever G to the triangular portion of the frame, while the foot-lever $g^3$ is for the purpose of raising and lowering the inner end of the triangular frame to elevate the power-wheel out of contact with the ground. The said lever is provided with foot-rests $g^{10}$, and a seat $g^{13}$ is secured to the brackets above the lever. The driver, by grasping the upper arm of the rock-shaft $g^5$ and pulling backward thereon, while at the same time pressing downward upon the foot-rests $g^{10}$, is able with but little effort to elevate the power-wheel a considerable height above the ground, the front end of the planter being supported by the tongue.

In operation the planter is driven over the ground to be planted with the power-wheel D in contact therewith. The wheel imparts rotation to the shaft C, which in turn rotates the dropping-wheels. Each of the openings in the dropping-wheel receives corn from the hopper during its passage thereunder and drops the same into the shoe when the wheel is rotated. When the end of the row is reached, the power-wheel is elevated out of contact with the ground, thus restraining the operation of the dropping mechanism while the turn is being made.

In the practical use of my machine the power-wheel would be provided with lugs at distances corresponding to the position of the openings in the dropping-wheel, thus providing an easy means for determining the position of the hills with respect to the rows. At the end of the row the driver will move the sliding plates to shut off the corn from the dropping-wheel while making the turn. After the turn is made the power-wheel is rotated by hand to bring the lugs into alinement with the dents left by the preceding traverse of the machine, after which the sliding plates are drawn out from the hopper and a new row commenced. By always bringing the lugs into alinement with the dents at the commencement of a new row a field planted by means of my improved planter may be plowed in both directions, both longitudinally and transversely of the rows. When it is desired to vary the distance of the corn in the row, this may be done by inserting the plugs $e^6$ in the superfluous holes in the dropping-wheel, and if it is desired to accurately mark the position of the corn in a row another power-wheel having a less number of lugs to correspond with the openings of the dropping-wheel may be placed upon the shaft.

It will be evident from the description that my improved planter is simple in construction, no gear-wheels nor chains being used, the dropping-wheel being mounted directly upon the power-shaft. The mechanism for operating the different parts of the machine is exceedingly simple and is not liable to get out of order. The planter may be constructed at small cost, and since there is no complicated mechanism connected therewith it will be very durable and not liable to easily get out of order.

Having thus described my invention, what I claim as new, and desire to secure by Letters Patent, is—

1. A corn-planter comprising a frame, composed of front and rear sections, the front section being substantially triangular in shape and comprising side bars and a cross-bar, the rear section being substantially rectangular in shape and comprising side bars hinged at their front ends to the side bars of the front section, a cross-bar connecting the rear ends of the side bars, an axle secured to the rear section intermediate the ends of the side bars, wheels on the axle, a shaft journaled on the side bars of the front section, a power-wheel secured to the shaft intermediate the side bars, and comprising a plurality of semicircular segments, outwardly-projecting lugs on the ends of the segments, bolts traversing openings in the lugs for securing the segments together, brackets on the front sections, hoppers supported by the brackets and having openings to receive the power-wheel shaft, dropping-wheels having spaced openings on their peripheral surface, corresponding to the position of the lugs on the power-wheel and secured to the ends of the power-wheel shaft within the hoppers, shoes arranged below the hoppers, means for raising and lowering the shoes, and means for raising and lowering the power-wheel with respect to the rear section.

2. A corn-planter comprising a frame, composed of front and rear sections, the front section being substantially triangular in shape, and comprising side bars and a cross-bar, the rear section being substantially rectangular in shape and comprising side bars hinged at their front ends to the side bars of the front section, a cross-bar connecting the rear ends of the side bars, an axle secured to the rear section intermediate the ends of the side bars, wheels on the axle, a shaft journaled on the side bars of the front section, a power-wheel secured to the shaft intermediate the side bars, and comprising a plurality of semicircular segments, outwardly-projecting lugs on the ends of the segments, bolts traversing openings in the lugs for securing the segments together, brackets on the front sections, hoppers supported by the brackets and having openings to receive the power-wheel shaft, dropping-wheels having spaced openings on their peripheral surface secured to the power-shaft within the hoppers, shoes supported below the hoppers, means for raising and lowering the shoes, and means for raising and lowering the power-shaft with respect to the rear section.

3. A corn-planter comprising a frame, composed of front and rear sections, the front section being substantially triangular in shape, and comprising side bars and a cross-bar, the rear section being substantially rectangular in shape and comprising side bars hinged at their front ends to the side bars of the front section, a cross-bar connecting the rear ends of the side bars, an axle secured to the rear section intermediate the ends of the side bars, wheels on the axle, a shaft journaled on the side bars of the front section, a power-wheel secured to the shaft intermediate the side bars, and comprising a plurality of semicircular segments, outwardly-projecting lugs on the ends of the segments, bolts traversing openings in the lugs for securing the segments together, brackets on the front sections, hoppers supported upon the front section, dropping-wheels having spaced openings on their peripheral surface secured to the power-shaft within the hoppers, shoes supported below the hoppers, means for raising and lowering the same, and means for raising and lowering the power-wheel with respect to the rear section.

4. A corn-planter comprising a frame composed of front and rear sections, the front section comprising side bars and a cross-bar, and the rear section being substantially rectangular in shape and comprising side bars hinged at their front ends to the side bars of the front section, a cross-bar connecting the rear ends of the side bars, wheels for supporting the rear section, a power-wheel journaled in the front section, and having oppositely-disposed lugs on the peripheral surface thereof, dropping-wheels having spaced openings on their peripheral surface corresponding to the position of the lugs on the power-wheel and connected directly therewith, hoppers inclosing the dropping-wheels, shoes supported below the hoppers, means for raising and lowering the shoes, and means for raising and lowering the power-wheel with respect to the rear section.

5. A corn-planter, comprising a frame composed of front and rear sections hinged together, wheels for supporting the rear section, a power-wheel journaled on the front section, oppositely-disposed lugs on the peripheral surface of the power-wheel, dropping-wheels having spaced openings on their peripheral surface corresponding to the position of the lugs on the power-wheel and directly connected therewith, hoppers inclosing the dropping-wheels, shoes supported below the hoppers, means for raising and lowering the shoes, and means for raising and lowering the power-wheel with respect to the rear section.

6. A corn-planter comprising a frame, composed of front and rear sections hinged together, wheels for supporting the rear section, a shaft journaled on the side bars of the front section, a power-wheel secured to the shaft intermediate the side bars and comprising a plurality of semicircular segments, outwardly-projecting lugs on the ends of the segments, bolts traversing openings in the lugs for securing the segments together, dropping-wheels having spaced openings on their peripheral surface corresponding to the position of the lugs on the power-wheel and secured to the ends of the power-shaft, hoppers inclosing the dropping-wheels, shoes supported below the hoppers, means for raising and lowering the shoes, and means for raising and lowering the power-wheel with respect to the rear section.

7. A corn-planter comprising a frame composed of front and rear sections hinged together, wheels for supporting the rear section, a power-wheel journaled in the front section, oppositely-disposed lugs on the peripheral surface of the power-wheel, brackets on the front section, hoppers supported by the brackets, dropping-wheels having spaced openings on their peripheral surface corresponding to the position of the lugs on the power-wheel and directly connected thereto, arranged within the hopper, shoes supported below the hoppers, means for raising and lowering the shoes and means for raising and lowering the power-wheel with respect to the rear section.

8. A corn-planter comprising a frame composed of front and rear sections, means for supporting the rear section, means for tilting the front section with respect to the rear section, a shaft on the front section, a power-wheel on the shaft, dropping-wheels on the shaft on either side of the power-wheel, hoppers inclosing the dropping-wheels, shoes supported below the hoppers, and means on the rear section for adjusting the shoes.

9. A corn-planter, comprising a frame, composed of hinged front and rear sections, means for supporting the rear section, means for tilting the front section with respect to the rear section, a power-wheel journaled in the front section, dropping-wheels connected directly with the power-wheel, hoppers inclosing the power-wheel, and shoes below the hoppers, and means on the rear section whereby to adjust the shoes.

10. A corn-planter comprising a frame, means for supporting one end of the frame, a power-wheel for supporting the opposite end of the frame, dropping-wheels connected directly with the power-wheel, shoes below the dropping-wheels, and means whereby to adjust the shoes to and from the dropping-wheels.

COLONEL WOLFORD LANHAM.

Witnesses:
   SOLON C. KEMON,
   PERRY B. TURPIN.